No. 748,711. Patented January 5, 1904.

UNITED STATES PATENT OFFICE.

MAX ELB, OF DRESDEN, GERMANY.

PROCESS OF PREPARING ALIMENTARY YEAST EXTRACTS.

SPECIFICATION forming part of Letters Patent No. 748,711, dated January 5, 1904.

Application filed October 11, 1901. Serial No. 78,374. (No specimens.)

*To all whom it may concern:*

Be it known that I, MAX ELB, a subject of the King of Saxony, and a resident of 21 Lüttichaustrasse, Dresden, in the Kingdom of Saxony, German Empire, have invented a new and useful Process of Preparing Alimentary Yeast Extracts, of which the following is an exact specification.

My invention relates to an improved process for preparing an alimentary yeast extract, and has especially for its purpose to provide a process by means of which an alimentary extract from yeast is obtained, which extract has the real taste of meat extract without any disturbing bitter or empyreumatical aftertaste.

In the processes used up to date it was a great disadvantage that the alimentary extracts always had a disturbing aftertaste, because in the first state of the process too little water was used, or, if this was not the case, because the mixtures of water and yeast in preparing the extract had to be brought to temperatures which had a very bad influence upon the taste of the extract, probably through the overheating of several yeast-particles and the decomposition of the very tender albuminoids. This bad aftertaste also arises in the processes in which the yeast-cells are killed by gradually increasing the temperature. These disadvantages are overcome by the following process.

The washed yeast is in small quantities brought into a large quantity of water, which has a sufficient temperature for killing the yeast-cells, which temperature is maintained during the whole time during which the yeast is brought into the water. According to the quality of the yeast this temperature may vary in certain limits, but a temperature between 60° and 70° centigrade has proved most fit for this purpose. In case a lower temperature is used, the yeast-cells will not be killed, while in case higher temperatures are used the albuminoids will coagulate. By bringing the yeast into the hot water the yeast-cells will immediately burst, so that the protoplasm contained in the same will flow out and can be perfectly made use of. Contrary to the process in which large quantities of the yeast are directly heated by this process, a fermentation of the yeast and herewith the bad influences of the fermentation, as well as the infection of the yeast with injurious microbes, are perfectly avoided. The quantity of water into which the yeast is brought must be sufficient for a dissolving of all dissolvable parts of the yeast, especially the mineral salts contained in the same. The liquid so obtained is now filtered and then condensed to the consistency of a paste. It will be understood that in condensing the liquid means for preventing a decomposition must be used, so, for instance, the condensing may be effected in a vacuum. In case it seems advisable the liquid can be filtered again before the product adopts a pasty form. The extract so obtained has a light-brown color and a very agreeable smell, similar to that of roast meat, and has not at all the bitter or empyreumatical aftertaste mentioned above. Furthermore, the extract contains in consequence of large quantities of water being used of a temperature which aids to dissolve the nutritive salts great quantities of such salts, especially phosphates, so that the extract is also from the hygienic point of view superior to the extracts hitherto prepared.

Having thus fully described the nature of my invention, what I claim, and desire to secure by Letters Patent of the United States, is—

The process of preparing an alimentary yeast extract, consisting in bringing the washed yeast in small quantities into a large quantity of water, which has a temperature of between 60° and 70° centigrade but not sufficient for coagulating the albumens, filtering the liquid so obtained and condensing the same to the consistency of a paste, substantially as set forth.

In testimony whereof I have signed my name to this specification in the presence of two subscribing witnesses.

MAX ELB.

Witnesses:
 HERNANDO DE SOTO,
 PAUL ARRAS.